June 30, 1970  H. B. WEBER  3,517,620
RAILWAY CAR TRUCK WITH FRICTION DAMPENED AXLES
Filed Nov. 16, 1966  3 Sheets-Sheet 2
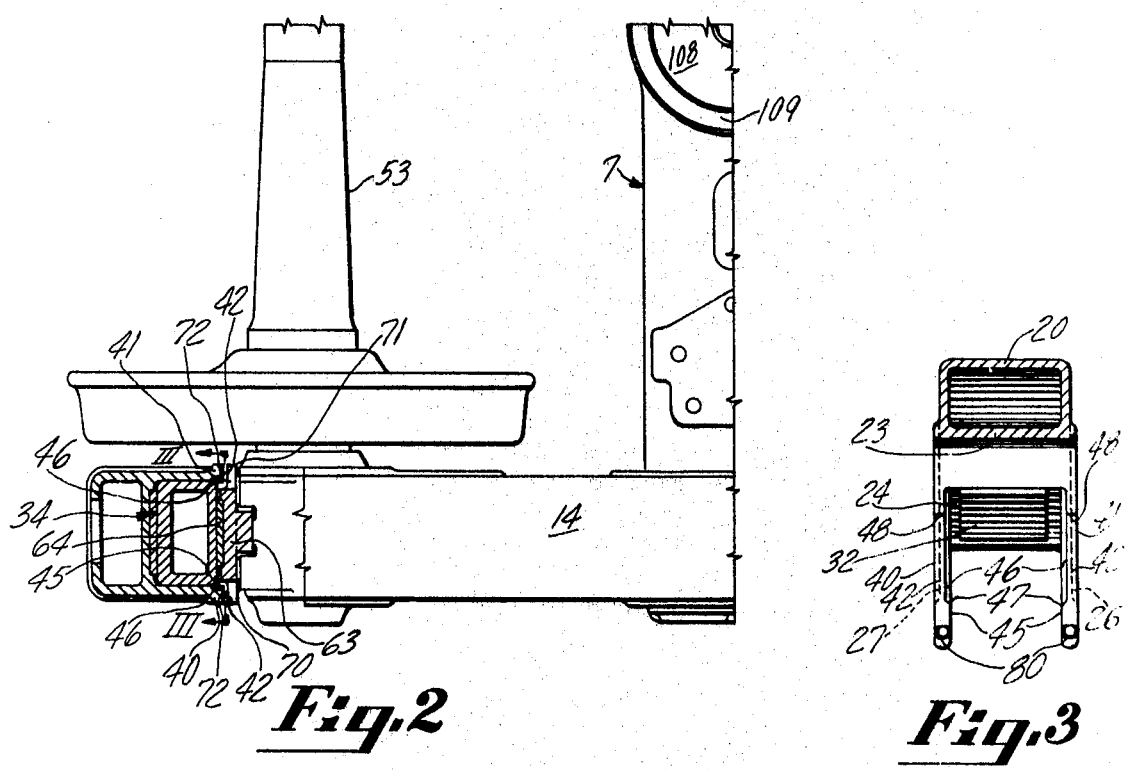
Fig.2
Fig.3
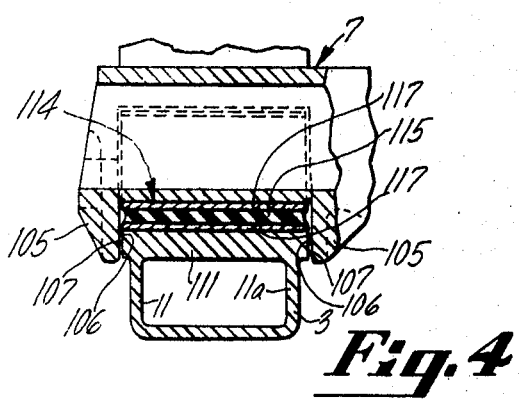
Fig.4
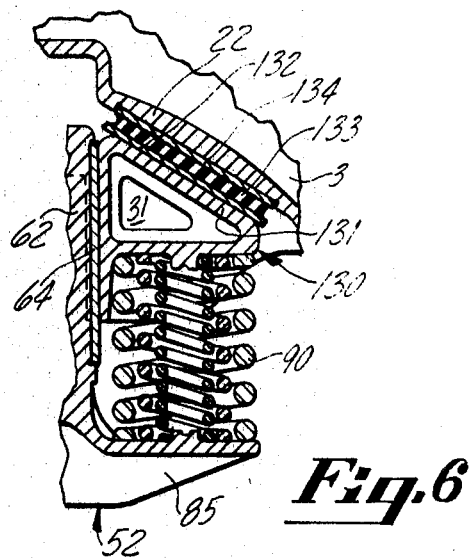
Fig.6
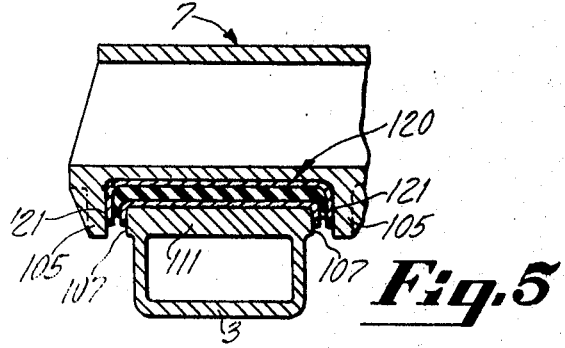
Fig.5
INVENTOR
HANS B. WEBER
BY
Henry Kozak
ATTORNEY

United States Patent Office 3,517,620
Patented June 30, 1970

3,517,620
RAILWAY CAR TRUCK WITH FRICTION DAMPENED AXLES
Hans B. Weber, Bedford, Ohio, assignor to Midland-Ross Corporation
Filed Nov. 16, 1966, Ser. No. 594,737
Int. Cl. B61f 5/00, 5/12, 5/30
U.S. Cl. 105—167      9 Claims

ABSTRACT OF THE DISCLOSURE

A four-wheel, two-axle railway car truck of the non-integral side frame and rigid bolster type having its axles in cushioned-snubbed relation with the side frames and its side frame-bolster connection in closefitting rockable relation in both the lengthwise and transverse direction of the side frame.

BACKGROUND OF THE INVENTION

In the design of a railway car truck for operating speeds in excess of 75 miles per hour, the truck must be capable of: (1) providing increased lateral motion of the axles relative to the car body, (2) reducing the dynamic forces between the wheel and rail and the transmission of these forces to the car body, (3) reducing to a minimum its tendency to assume an out-of-square configuration, (4) providing improved tracking characteristics of the wheel and axle assembly relative to the rail, and (5) providing proper damping for improved car stability.

Generally present day standard freight car trucks of the bolster snubbed type are capable of providing from only ½ inch to 1¼ inches total lateral motion; that is, truck motion which is transverse to the longitudinal centerline of the track. In high speed train performance, this amount of lateral motion is insufficient for obtaining a soft lateral ride characteristic.

Attempts have been made in railway car truck design to provide for a softer lateral ride characteristic by suspending the freight car body via the truck bolster on swing-hanger assemblies that are mounted in the side frame intermediate the ends of the frame. The swinging action of the hangers, which act like pendulums, permits the wheel axle frame assembly of the truck to move sideways relative to the car body thereby partially absorbing the lateral impacts transferred from the rails to the side frame. However, such design does not substantially reduce the dynamic forces developed between the wheel and rail as a result of vertical impact.

When a railway car is traveling over a given track at a given speed and a rail irregularity, such as a projecting rail joint, is encountered, the wheel of the truck must negotiate the irregularity. This will require a lifting of the wheel and axle assembly and the unsprung mass connected to it. Depending on the speed of the railway car, this upward lifting of the total unsprung mass will cause it to accelerate. The higher higher the speed, the larger the acceleration and with a larger acceleration, the higher will be the forces that are required to lift the unsprung mass. Since the upward travel of the mass does not stop instantaneously at the height of the rail disturbance, the wheel will travel a curved path of flight and fall back with an impact on the rail at the end of its trajectory. During this period of dynamic disturbance, the forces are transmitted through the suspension system to the car body. Such force accelerates the wear between the wheel and rail and the component parts of the railway car truck. Hence by reducing the unsprung mass of the car truck, these forces can be substantially reduced.

One method of reducing the unsprung mass of a four-wheel railway car truck is to include the side frames of the truck with the sprung mass and provide an independently sprung axle suspension system. Generally in such a truck, the two side frames are rigidly connected to each other by two integral transom members. This rigid frame construction eliminates truck parallelogramming (the leading or lagging of one side frame relative to the other) and directly reduces to a minimum the tendency of the lead wheel to climb the rail during curve negotiation, which climbing tendency is directly related to the angle of attack between the wheel flange and railhead; that is, the included angle therebetween. To maintain equalization of the load on all four wheels to thereby avoid twisting of the rigid frame, equalizing members are generally employed to transfer part of the weight from one axle to the other. To incorporate essentially the same equalizing feature in a non-integral side frame and bolster truck and also reduce to a minimum the tendency of the lead wheel to climb the rail—maximum rigidity of the bolster-side frame connection is a necessity. Such rigidity minimizes truck parallelogramming and promotes longer wheel flange life as well as safer operations at higher train speeds.

In order to further reduce the angle of attack between the lead wheel and rail and provide for proper tracking characteristics of the axle relative to the rail during curve negotiation, the axle must have a self-steering capability independent from the truck. This necessitates a longitudinal and angular motion capability of the axle relative to the side frame to thereby permit the axis of the axle to align itself with the radius of the track curvature.

To provide an independently sprung axle suspension system with vertical, lateral and longitudinal motion capability at high operating train speeds, proper damping of the suspension system is of considerable importance for car stability. The damping requirements necessary to obtain a good riding characteristic in an axle motion truck are met by employing a Coulomb type snubbing mechanism that is activated by the load suspension system. Since the full load is being carried through the snubbing mechanism, a given designed amount or percentage of force may be used to control the oscillations of the unsprung mass, the resulting swing-hanger type action of the frame, and the longitudinal motion of the axle.

It is therefore an important object of this invention to provide a railway car truck having satisfactory functional and riding performance when operated at road speeds in excess of seventy-five miles per hour.

It is a further object to provide a car truck for heavy duty high-speed freight car use of the type in which the side frames are sprung with respect to the axles to achieve a low unsprung-to-sprung weight ratio and to incorporate geometric and mechanical advantages heretofore unknown to this type of car truck.

Another object of this invention is to provide a railway car truck having extended lateral motion capability.

Yet another object is to provide a four-wheel axle motion railway car truck having angular motion capability of the axle and saddle assembly relative to the side frame.

Still another object is to provide a railway car truck having bolster-side frame construction that reduces the parallelogramming of the truck to a minimum.

SUMMARY OF THE INVENTION

The above and other objects of the invention are achieved in a car truck comprising two axle-wheel assemblies extending from track-to-track, two side frames, and a bolster wherein each side frame is resiliently supported on both axles of the assembly, and the bolster and the side frames have cooperating structure for connecting the bolster with each side frame in pivotal relation for restricting the parallelogramming of the truck by limiting the horizontal angular movement of the bolster to an angle of approximately 0°45' in either direction from its neutral position.

In a preferred embodiment of the invention, each side frame comprises pedestal housings at opposite ends accommodating journal saddles mounted on each axle, and friction snubbing components in each pedestal housing engaging the journal saddle therein. In the most preferred embodiment wedges of the snubbing syster are in upward series relationship with load springs seated on the journal saddle to effectively utilize the basic geometry of a side frame.

In the drawings, with respect to which the invention is described below:

FIG. 2 is a fragmentary plan view, partially in section, taken along lines II—II of FIG. 1;

FIG. 3 is an elevation in transverse section taken along lines III—III of FIG. 2;

FIG. 4 is a fragmentary elevation in transverse section taken along lines IV—IV of FIG. 1;

FIG. 5 is an elevational view similar to FIG. 4 embodying a modified form of the invention;

FIG. 6 is a fragmentary vertical sectional view showing another embodiment of the invention;

Figure 1:
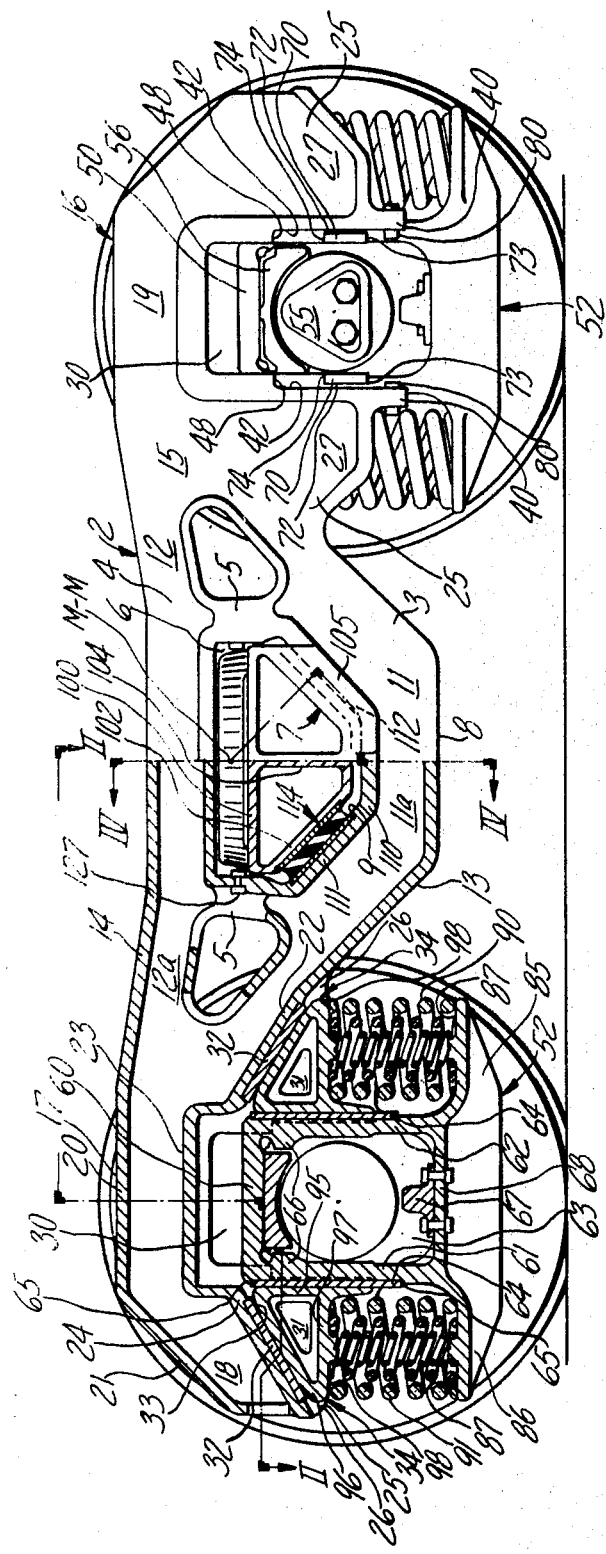
FIG. 1 is a side elevation, partially in section, of a railway car truck in accordance with the invention.

Referring now to FIGS. 1 through 3 of the drawings, a partial view of an axle motion railway car truck is illustrated. The truck comprises a side frame 2 having a tension member 3 and a compression member 4. Centrally of the frame, a pair of spaced vertical columns 5, 5 connect members 3 and 4 to form and partially define a bolster opening 6. Opening 6 receives one end of a bolster 7 arranged with its longitudinal axis normal to the length of the frame 2. Tension member 3 includes a central portion 8 to provide a seat 9 for supporting the end of the bolster as hereinafter described.

Tension member 3 and compression member 4 each have a pair of laterally spaced side walls 11, 11a and 12, 12a, respectively, that are joined by a transverse web 13 and 14, respectively. Members 3 and 4 generally merge as at 15 and the frame continues therebeyond to define a pedestal housing 16 having an upper portion 17. Upper portion 17 is box-like in cross section with laterally spaced inboard and outboard side walls 18 and 19. Side walls 18 and 19 are joined by a continuation of web 14 of compression member 4 to form top wall 20 and sloping outer end wall 21. Web 13 of tension member 3 extends upwardly at an inclined angle, as a sloping wall 22, into the housing 16 and merges with upper portion 17 to form bottom wall 23 and sloping inner end wall 24. Walls 22 and 24 diverge from an imaginary apex that is contained in a vertical plane which bisects the included angle formed between the walls.

Housing 16 comprises longitudinally spaced hollow pedestal legs 25, 25 that are formed by the continuation of inboard and outboard side walls 18 and 19 and as denoted by walls 26 and 27. Each pair of spaced legs at each end of the side frame defines a pedestal opening 30 therebetween. Each hollow leg, in combination with its respective sloping wall, defines a pocket 31 within the leg. Within each pocket there is disposed on the sloping wall a wear plate 32 having a downwardly facing friction wedge seat 33 for engagement with a friction wedge 34.

Each pedestal leg 25, 25, adjacent to the pedestal opening 30, has a pair of vertically extending ribs 40, 41. Each rib 40, 41 presents a vertical guide surface 42, 42 which faces the pedestal opening 30. The guide surfaces 42, 42 are in coplanar relationship and partially define the perimeter of pedestal opening 30. In addition, each leg has a pair of spaced opposed planar surfaces disposed on the inwardly facing portion of each rib 40, 41 adjacent to the pedestal opening 30. Each pair of planar surfaces are defined by a lower vertical surface 45 and an upper laterally offset flat surface 46. The juncture of surfaces 45 and 46 provides a fulcrum point 47 which is more fully described hereinafter. As best viewed in FIG. 1, the upper portion of each rib 40, 41 extends longitudinally inwardly along the peripheral edges of the housing bordering the opening 30 to define a downwardly facing surface 48 which functions as a stop as hereinafter set forth.

The pedestal opening 30 receives a journal housing 50 of a journal saddle 52 which in turn receives one end of a wheel and axle assembly 53. The end of the axle journal is received in an antifrictional roller bearing unit 55 which cooperates with a bearing adaptor 56 within the journal housing 50.

Journal housing 50 comprises a top wall 60 and longitudinally spaced apart vertically extending walls 61 and 62 that defines a region 63 therebetween. Region 63 receives the adaptor and journal bearing assembly hereinabove mentioned. A pair of friction paltes 64, 64 are disposed between a pair of vertically spaced lugs 65, 65 on the outwardly facing surfaces of walls 61 and 62. Disposed on each wall 61 and 62 within the region 63 are a pair of adaptor retaining lugs 66, 66 for maintaining the adaptor laterally within the region 63. In the assembled position, the crowned surface of the adaptor 56 is in abutting relation with the top wall 60. This permits a relative rocking movement between the adaptor and saddle for a purpose further explained below. A conventional bearing retaining block 67 is secured to a bottom wall 68 of the housing for maintaining the wheel and axle assembly and bearing adaptor in assembled position.

Referring to FIG. 2, it will be seen that each vertical wall of the journal housing 50, intermediate its lengthwise direction, has a pair of outwardly extending guide flanges 70, 71 that are contained in the general plane of each wall. Flanges 70, 71 define a pair of guide faces 72, 72 in opposed relation to the vertical guide surfaces 42, 42. Hence flanges 70, 71 limit the relative movement of the saddle between the pedestal legs 25, 25 lengthwise of the frame. Each flange provides a downwardly and upwardly facing surface 73, 73 and 74, 74, respectively. To prevent the vertical separation of the saddle from the frame, surfaces 73, 73 engage a stop means 80. Stop means 80 comprises a nut and bolt assembly that is disposed on the lower portion of each outboard side wall rib 40 in spaced underlapping relation to flanges 70, 70 of the journal housing 50. Thus as housing 16 moves upwardly relative to the saddle, the stop means 80 will cooperate with surfaces 73, 73 of the flanges to limit the upward movement of the housing. To limit the extreme upward movement of the saddle relative to the housing 16, the downwardly facing surfaces 48, 48 on ribs 40, 41 will engage the upwardly facing surfaces 74, 74 on flanges 70, 71.

A pair of arms 85 and 86 extend longitudinally outwardly in opposite coplanar directions from the bottom of the journal housing 50. Each arm, 85 and 86, presents an upwardly facing surface 87, 87 which serves as the lower spring support seat for the suspension system of the railway car truck. The suspension system of the truck comprises a pair of load spring assemblies 90, 91 which are positioned on the lower spring support seat for transferring the load of the car through the frame to the saddle.

As mentioned hereinabove, each hollow pedestal leg 25, 25 is provided with a wedge pocket 31 for accommodating a wedge 34. Each wedge 34 has a flat vertical wall 95 and an inclined curved or crowned wall 96 having a friction surface thereon for engagement with the wear plate 32. A horizontal wall 97, normal to the vertical wall 95, connects the diverging walls 95 and 96. Wall 97 has a downwardly facing surface 98 which defines an upper spring support seat for the load springs of the car truck. In the assembled position of the car truck, the wedges are disposed on top of the load springs within the pockets and are pressed into engagement with the friction plates to dampen the vertical and lateral movements of the saddle relative to the side frame and resiliently maintain the journal housing 50 centrally located relative to the pedestal legs 25, 25. Therefore each friction wedge forms a part of a snubbing system that is governed by the action of the load springs and accordingly each wedge provides a frictional force proportional to the car loading, not only for vertical and lateral movements, but also for the longitudinal movement of the saddle relative to the side frame. That is, the friction wedge-load spring arrangement permits, in cooperation with the longitudinal clearance provided between the saddle and pedestal legs, a longitudinal movement of the saddle-axle assembly relative to the side frame. This longitudinal movement, in combination with the vertical and lateral movements of the saddle, permits the saddle-axle assembly to have an angular motion capability relative to the side frame. This latter capability provides the axle assembly with a self-steering capability independent of the side frame since it permits the axis of the axle to align itself with the radius of the track curvature during curve negotiation.

Briefly, full lateral motion of the car truck is obtained in the following manner. Lateral motion of the wheel and axle assembly, which is connected to the upper portions of the saddle by the adapter 56, causes the saddle 52 to move in the same direction. The motion of the saddle is initially resisted by the resistance of the load spring assemblies 90, 91 to deflect laterally. Since the lateral forces applied to the upper portion of the saddle are resisted at the lower load spring support seats 87, 87, the saddle assumes a leaning position. This motion is assisted by the rocking of the saddle on the crown surface of the adapter. After a predetermined amount of lateral movement, the end surfaces of the side walls 61 and 62 on journal housing 50 engage the vertical surfaces 45 on the ribs of the legs 25, 25. Further extended lateral motion of the saddle is resisted by the lower ends of the pedestal legs 25, 25 to thereby cause the saddle to pivot about the fulcrum points 47 thereby causing an increased leaning of the saddle without increasing the lateral deflection of the load springs. The saddle is limited in its tilting movement by the engagement of the top portion of the side wall end surfaces of the journal housing 50 with the inner flat surfaces 46.

It will be noted that the above lateral motion is a swing-hanger type of motion having a variable lateral load rate deflection characteristic. That is, after a predetermined amount of swing or leaning of the saddle, contact between the lower portion of the guide columns and the saddle frame is established. At this instance, the axis of rotation is moved up to the fulcrum points. To tilt or rotate the saddle further, a higher force is required to overcome the shortening of the effective length of the pendulum arm or swing-hanger arm. As a notable feature of the invention, the car truck is designable, according to the teaching above, to a specific lateral deflection rate characteristic for a given car body. That is, the overall length of the pendulum arm can be increased or decreased by varying the height between the crowned surface of the adapter and the lower load spring support seats and by varying the height of the fulcrum points relative to the lower load spring support seat.

Another feature of the invention is the rigidity of the side frame-bolster connection which reduces the tendency of the truck to assume an out-of-square configuration known by some as "parallelogramming," wherein the longitudinal axis of the bolster assumes an angle, from its neutral position, other than 90 degrees relative to the lengthwise direction of the side frame.

As mentioned hereinabove, truck parallelogramming promotes wheel flange wear by permitting the wheel flange to rub against the railhead during curve negotiation. For example, as a car truck is negotiating a curved track, the outer lead wheel flange is hitting the outer rail at an angle dependent upon the degree of track curvature. This angle of attack between the wheel flange and the railhead produces a drag on the wheel which in turn forces the axle to urge the inner side frame ahead of the outer side frame. This, as a result, causes the bolster to angle in a horizontal plane with the amount of out-of-squareness between side frames being dependent upon the degree of horizontal angling permitted.

To reduce the degree of truck parallelogramming, the bolster construction at each of its ends comprises a top and bottom wall 100 and 101, respectively, joined by sloping side walls 102 and 103. Preferably the side walls diverge upwardly and away from the bottom wall 101. A vertical reinrorcement wall 104 is disposed centrally of the side walls. A pair of laterally spaced and vertically depending flanges 105, 105 project downwardly from the bottom wall and side walls into a flanking relation with the central portion 8 of tension member 3. Flanges 105, 105 are each provided with an inwardly facing surface 106 that is in spaced opposed relation with a laterally outwardly facing surface 107 provided on each of the side walls 11, 11a of tension member 3. The spaced relationship between the surfaces 106 and 107 is designed to a predetermined clearance and defines the amount of transverse horizontal movement of the bolster relative to the side frame in either direction. Since, as illustrated in the embodiment shown, the span of the flanges are equal to the width of the bolster end, the degree of horizontal angling is equal to the total predetermined clearance divided by the bolster width. In the embodiment illustrated the predetermined clearance is equal to $\frac{1}{16}$ of an inch and the amount of horizontal angling of the bolster in either direction is on the order of 0°23' from its neutral position. The maximum amount of angling of the bolster relative to the side frame in either direction is on the order of 0°45' and defines a substantially rigid bolster-side frame connection in the horizontal plane.

In order to equalize the rail irregularities plus the vertical spring deflections of each axle over the wheel base of the side frame, the side frame is permitted to rotate about an axis contained in the central vertical plane of the bolster. In the preferred embodiment, the side frame rotates about an axis M—M having its center disposed at the intersection of the longitudinal central vertical planes of the bolster and side frame and the horizontal plane containing the base or floor 108 of bolster center plate structure 109. In positioning the axis of rotation in the plane of the center plate structure, the bolster theoretically remains stationary during the rotation of the side frame. In positioning the axis of rotation above or below the preferred location, additional forces are transferred to the center plate structure thereby increasing abrasion and hence, the wearing rate between the parts in the center plate structure.

To permit the side frame to rotate relative to the bolster, the bolster seat 9 of tension member 3 comprises a horizontal wall 110 disposed centrally of the opening 6, and upwardly diverging end walls 111 and 112 having an imaginary apex contained in the longitudinal central vertical plane of the bolster. The included angle between the walls 111 and 112 is equal to the included angle defined by bolster side walls 102 and 103 to thereby position the opposed walls of the bolster and bolster seat in parallel relationship at neutral position. A damping unit 114 is received between the opposed walls for positioning the bolster in spaced relation to seat 9. Each unit comprises a resilient material or pad 115 having bonded to each side thereof plates 117, 117. Each plate is receivable in a correspondingly shaped recess to maintain the unit in fixed relation with the opposed walls. In addition to permitting the side frame to rotate about the axis hereinabove mentioned, the damping unit 114 functions as a means to progressively reduce the transmission of high frequency vibrations into the car body. It is noted that the smaller the included angle between the walls 111 and 112; that is, the greater the inclination of the walls, the greater the reduction of high frequency transmission since the pad 115 will be subjected to lower compressive and higher shearing stresses.

FIG. 5 illustrates a modified damping unit 120 having a pair of depending lips 121, 121. Each lip 121 is formed on an opposite side of the unit 120 to define a U shaped unit having portions which overlap the surfaces 107, 107 of tension member 3. Such overlapping structure cushions the transverse movement of the bolster relative to the side frame.

To restrict the upward movement of the bolster 7 relative to the side frame 2, each column 5, 5 is provided with an abutment comprising a nut and bolt assembly 127. The abutment projects outwardly from the column into the bolster opening 6 in vertically spaced overlapping relation to top wall 100 of the bolster to thereby prevent the separation of the bolster from the side frame. The abutment is disposed on the columns 5, 5 at a distance from the top wall 100 less than the overlapping relationship of the flanges 105, 105 relative to the tension member 3.

Referring now to FIG. 6, there is illustrated a modified friction wedge 130 having an inclined flat wall 131. In comparing wedge 34 with wedge 130, it will be noted that the rear sloping wall of wedge 34 is crowned. This curved structure permits wedge 34 to rock on wear plate 32 when the wheel negotiates a rail irregularity; that is, a high or low spot in the track. As mentioned hereinabove, when a rail disturbance is encountered, the side frame equalizes or rotates about the axis M—M. By permitting the wedges 34 to rock within pockets 31, full area contact is maintained between the wedges and plates 64 of the saddle frame. If wedges 34, 34 were not permitted to rock during side frame equalization, a resulting force couple would be established at the diagonally opposite ends of the wedges; that is, the tip of one wedge and the toe of the other wedge. This force couple acting upon the wedges would tend to rotate the saddle within the journal housing 50.

Full area contact between wedge 130 and the saddle can be maintained by employing a wear plate that is permitted to move relative to the side frame during side frame equalization. As shown, wear plate 132 is bonded to one side of a pad 133 of rubber or rubber-like material. Secured to the other side of the pad is a metallic plate 134 that is receivable in the recess provided in the sloping wall 22 of the side frame. Since the total supporting force of the load spring assemblies is transferred through the wedges to the side frame, the pads 133, 133, which are arranged at an angle relative to the load springs, are loaded in shear; thus enabling the wear plate 132 to automatically align itself during side frame equalization. The pads 133, 133 function also as additional vibration dampeners for damping out vibrations before they can be transmitted to the side frame through the friction snubbing system.

Figure 7:
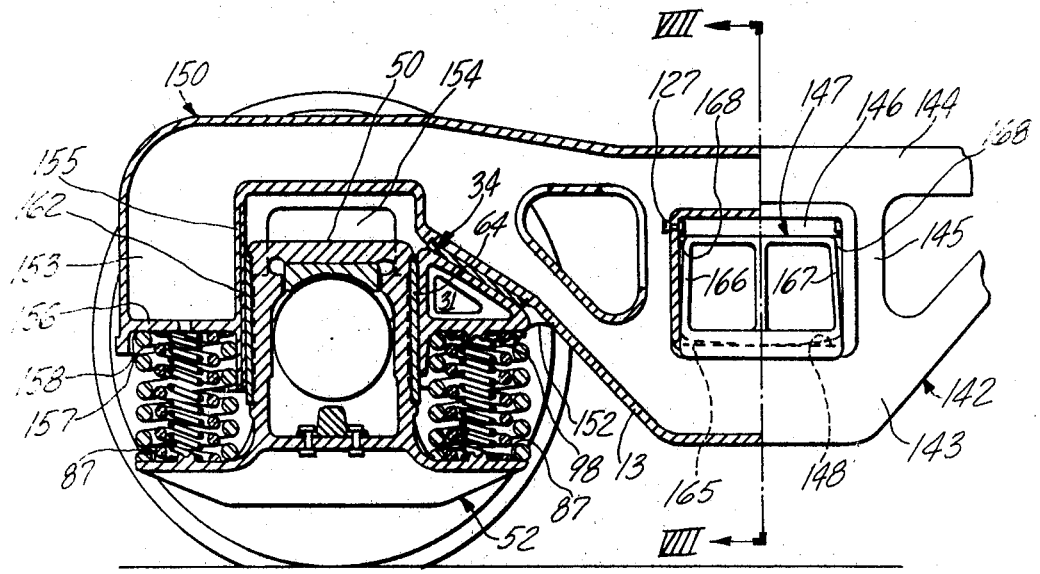
FIG. 7 is a fragmentary side elevation, partially in section, of another embodiment of the invention.
Figure 8:
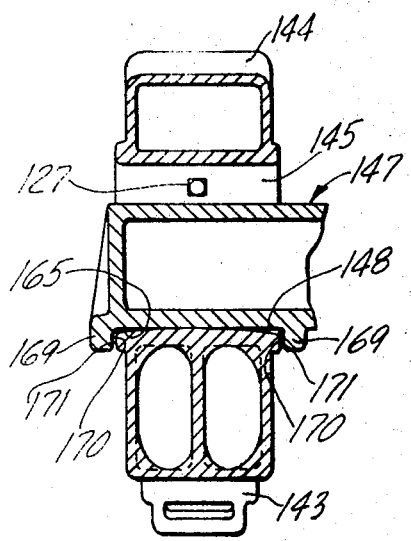
FIG. 8 is a fragmentary elevation in transverse section taken along lines VIII—VIII of FIG. 7.

A partial view of a modified independently sprung axle truck is illustrated in FIGS. 7 and 8. Briefly, the truck comprises a side frame 142 having a tension member 143 and compression member 144. Spaced vertical columns 145, 145 connect the members 143, 144 to define a bolster opening 146 which receives one end of a bolster 147 that is supported on a seat 148.

As in the preferred embodiment, the tension and compression members merge at their ends to define a pedestal housing 150 having the web 13 of the tension member extending upwardly at an inclined angle into the housing. Housing 150 comprises a pair of longitudinally spaced hollow pedestal legs 152, 153 defining therebetween a pedestal opening 154 that receives the journal housing 50 of saddle 52.

Basically, the housing 150 is similar to housing 16 except for the outer pedestal leg 153. Leg 153 is provided with an inwardly facing vertical guide wall 155, and a horizontal bottom wall 156 which connects the side walls and end wall of the housing to form a pocket 157 having a downwardly facing surface 158. Leg 152 contains the wedge pocket 31 that receives in its normal operating position the friction wedge 34. In the assembled position of the journal housing in the pedestal opening, seats 98 and 158 are in coplanar relationship and in vertical registry with the upwardly facing load spring support seats 87, 87 of the saddle. In operation the wedge 31 is forced against the wear plate 64, which in turn urges the saddle frame towards the outer pedestal leg and against a wear plate 162 disposed on vertical wall 154.

To permit side frame equalization, the underneath portion of the bolster is curved in the transverse direction of the bolster to define a surface 165 disposed along an arc in the vertical longitudinal plane of the side frame. In the embodiment shown, the bolster seat 148 is of convex contour in the transverse direction of the frame and receives in supporting rockable relation one end of the bolster 147. Such engaging structure defines an axis of rotation for both the side frame and bolster in both the longitudinal and transverse directions of the side frame. To accommodate rotation of the side frame about an axis contained in the central vertical plane of the bolster, the side walls 166, 167 of the bolster converge in a direction away from the bottom surface 165 to define a wedge-shaped gap 168 between each column 145 and the opposing bolster side wall. As in the preferred embodiment, a pair of spaced flanges 169, 169 extend from the bolster's bottom wall to present a pair of surfaces 170, 170 in flanking relation with cooperating side frame surfaces 171, 171. Flanges 169, 169 are spaced at a predetermined distance from the side frame to restrict the longitudinal movement of the bolster relative to the side frame and to arrest the horizontal angling of the bolster.

Thus, what has been described hereinabove is a railway car truck having superior ride, better tracking and characteristics and better control of car resonance oscillations, such as car roll, at operating speeds in excess of 75 miles per hour.

What is claimed is:

1. A railway car truck comprising:
(A) a side frame having tension and compression members merging adjacent their ends to provide a pedestal housing, said housing having a pair of spaced vertical pedestal legs; and spaced vertical columns integrally connecting said members and defining therewith a bloster opening;
(B) a bolster having an end section disposed in said opening in right angular relationship to the lengthwise direction of the side frame;
(C) a journal saddle having a base and a centrally located journal housing interposed in longitudinal space relation with said legs and arranged for vertical and lateral movement therewith, said journal housing receiving the journal end of a wheel and axle assembly along a horizontal journal axis of fixed relation with said journal housing, and said pedestal legs being longitudinally spaced apart a distance greater than the longitudinal width of said journal housing so as to permit the axle and saddle assembly to have an angular motion capability relative to the side frame to thereby provide the axle assembly with a self-steering capability independent of the side frame;

(D) vertically reacting spring means disposed in each leg between said base and the frame for supporting said frame;

(E) friction means disposed between each of said legs and the journal housing for resisting relative vertical and lateral movements of said saddle relative to said frame, said friction means associated with said pedestal leg intermediate the bolster and journal housing comprising a friciton wedge urged into engagement with said journal housing and said last named leg by said spring means to provide a frictional force proportionate to the load per unit of deflection of said spring means; and (F) stop means on said bolster overlapping the sides of said frame and adapted for engagement with the opposing faces on the frame for substantially restricting in the lengthwise direction of the bolster the longitudinal movement of the bolster relative to the frame; said means further restricting the horizontal angling of the bolster relative to the frame to 0°45′ in either direction from said right angular relationship to defiine in the horizontal plane of the bolster a substantially rigid bolster-side frame connection.

2. A car truck in accordance with claim 1 wherein:
(A) the friction means disposed between the other pedestal leg and said journal housing comprises a second friction wedge disposed in said other leg and urged into engagement with said journal housing and said other leg by said spring means to provide a frictional force proportionate to the load per unit of deflection of said spring means.

3. A car truck according to claim 1 comprising:
(A) abutment means projecting from the side frame columns into the bolster opening in overlapping relation to said bolster, said abutment means being vertically spaced above the bolster an amount less than the overlapping relationship of said stop means to thereby prevent the accidental separation of the bolster from the side frame.

4. The car truck of claim 1 wherein the saddle and side frame comprise:
(A) cooperating pivotal and stop means to permit extended lateral motion of the axle assembly relative to the side frame by a tilting movement of the saddle relative to the side frame about an axis extending lengthwise of the frame.

5. The car truck of claim 1 wherein the journal housing and pedestal legs comprise:
(A) fulcrum means disposed at a level below the level of the journal axis permitting extended angular displacement of the saddle in either lateral direction from a longitudinal central vertical plane of the side frame.

6. A railway car truck comprising:
(A) a side frame having tension and compression members merging adjacent their ends to provide an end portion;
(B) a pedestal jaw depending from each end portion, said jaw comprising a pair of spaced vertical pedestal legs, one of said legs being connected to said tension member and the other of said legs being connected to the outer end of said end portion;
(C) a journal saddle having a base and a journal housing centrally located on the base receivable between said legs and arranged for relative vertical, longitudinal and lateral movement therewith, said journal housing receiving a journal of a wheel and axle assembly along a horizontal journal axis of fixed relation with said journal housing, and said pedestal legs being longitudinally spaced apart a distance greater than the longitudinal width of said journal housing so as to permit the axle and saddle assembly to have an angular motion capability relative to the side frame to thereby provide the axle assembly with a self-steering capability independent of the side frame;

(D) spring means disposed in each of said legs for supporting said frame relative to the base of said saddle; and (E) friction means disposed between each of said legs and the journal housing for resisting relative vertical longitudinal and lateral movements of said saddle and said frame, at least one of said friction means having frictional characteristics dependent upon the load rate of said spring means comprising a friction wedge disposed in said tension member leg and supported in frictional engagement against said journal housing and said tension member by said spring means.

7. The car truck of claim 6 wherein:
(A) the friction means disposed between the other pedestal leg and said journal housing comprises a pair of wear plates having opposed cooperating surfaces.

8. The car truck in accordance with claim 6 wherein:
(A) the friction means disposed between the other pedestal leg and said journal housing has a frictional characteristic dependent upon the load rate of said spring means and comprises a second friction wedge disposed in said other leg and urged into engagement with said journal housing and said other leg by said spring means.

9. The car truck of claim 8 wherein each pair of spaced pedestal legs define a pedestal opening therebetween and each leg comprises:
(A) a pair of side walls spaced transversely relative to the length of the frame and a rear wall between the side walls sloping upwardly and toward said pedestal opening and defining a pocket therebetween; and
(B) a wear plate yieldably mounted on said sloping wall for receiving in sliding engaging relation said friction wedge.

References Cited

UNITED STATES PATENTS

| | | | |
|---|---|---|---|
| 809,505 | 1/1906 | Hopkins | 105—198 |
| 2,132,382 | 10/1938 | Barrows | 105—224 |
| 2,211,462 | 8/1940 | Hobson | 267—3 |
| 2,211,463 | 8/1940 | Hobson | 267—3 |
| 2,720,848 | 10/1955 | Couch | 105—224 |
| 2,867,177 | 1/1959 | Blattner | 105—198 XX |
| 2,132,385 | 10/1938 | Barrows | 105—207 |
| 2,273,201 | 2/1942 | Holland et al. | 105—224 X |
| 2,572,113 | 10/1951 | Couch | 105—224 |
| 3,339,498 | 9/1967 | Weber | 105—197 |

ARTHUR L. LA POINT, Primary Examiner

H. BELTRAN, Assistant Examiner

U.S. Cl. X.R.

105—193, 197, 198, 201, 224, 225; 267—4